United States Patent [19]

Chang

[11] Patent Number: 5,675,798

[45] Date of Patent: Oct. 7, 1997

[54] SYSTEM AND METHOD FOR SELECTIVELY AND CONTEMPORANEOUSLY MONITORING PROCESSES IN A MULTIPROCESSING SERVER

[75] Inventor: David Yu Chang, Austin, Tex.

[73] Assignee: International Business Machines Corporation, Armonk, N.Y.

[21] Appl. No.: 649,920

[22] Filed: May 16, 1996

Related U.S. Application Data

[63] Continuation of Ser. No. 469,704, Jun. 6, 1995, abandoned, which is a continuation of Ser. No. 97,506, Jul. 27, 1993, abandoned.

[51] Int. Cl.$^6$ .................................................. G06F 13/00
[52] U.S. Cl. .............. 395/680; 395/200.03; 395/200.08; 395/326
[58] Field of Search ...................... 395/200.03, 200.08, 395/326, 680

[56] References Cited

U.S. PATENT DOCUMENTS

| | | | |
|---|---|---|---|
| 4,077,058 | 2/1978 | Appell et al. | 364/200 |
| 4,530,051 | 7/1985 | Johnson et al. | 364/200 |
| 4,809,065 | 2/1989 | Harris et al. | 358/88 |
| 4,858,152 | 8/1989 | Estes et al. | |
| 4,937,784 | 6/1990 | Massi et al. | |
| 4,949,248 | 8/1990 | Caro. | |
| 5,057,996 | 10/1991 | Cutler et al. | 364/200 |
| 5,249,293 | 9/1993 | Schreiber et al. | 395/650 |
| 5,319,645 | 6/1994 | Bassi et al. | 371/19 |

OTHER PUBLICATIONS

AT&T UNIX System 5 (User's Reference Manual), 1987, Prentice Hall Englewood Cliffs, US.
IBM Technical Disclosure Bulletin, vol. 28, No. 9, Feb. 86, "Multi–Thread Host Server For PC Support", pp. 3848–3855.
IBM Technical Disclosure Bulletin, vol. 31, No. 8, Jan. 89, "Method for Managing Client/Server Relationships in the AIX Operating System", pp. 195–198.
IBM Technical Disclosure Bulletin, vol. 36, No. 6B, Jun. 93, "Remote Database Status", pp. 269–270.
*Telemat. Inform.,* 1991, UK, "A Hierarchical Distributed Control Model, for Coordinating Intelligent Systems", vol. 8, No. 4, pp. 385–402 (Abstract).
*Software Pract. & Exper.,* Jul.–Sep. 1974, GB, "Use of a Software Monitor in the Validation of an Analytic Computer System Model", vol. 4, No. 3, pp. 255–263. (Abstract).
IBM TDB, "Real–Time Database Performance Monitor—Application Workstation", vol. 34, No. 4A, Sep. 1991, pp. 49–50.
IBM TDB, "Internal Performance Measurement Counters", vol. 34, No. 4A, Sep. 1991, pp. 51–52.

*Primary Examiner*—Glenn A. Auve
*Attorney, Agent, or Firm*—Casimer K. Salys

[57] ABSTRACT

A system, method and program product for determining and displaying the status of client application programs executing on a multiprocessing server. Server process control blocks and synchronization object descriptors are created in the shared memory of the server. Application program interfaces APIs are linked to the control blocks and descriptors during the execution of the various multiprocessing application programs. A status utility related to the service process monitor selectively accesses information from the control blocks and descriptors to determine the status of the individual multiple processes executing on the server workstation. In a preferred form, the status information is conveyed to and displayed on a video display associated with the service process monitor. In contrast to operating system monitors which disclose the status of all processes as a whole, the present server process monitor particularizes the information to the specific client process. Thereby, the information is of a granularity to identify processes which are hung up on semaphores, message queues, or the like. The information is at the level used by a system administrator or software developer.

6 Claims, 6 Drawing Sheets

SYSTEM AND METHOD FOR SELECTIVELY AND CONTEMPORANEOUSLY MONITORING PROCESSES IN A MULTIPROCESSING SERVER

This is a continuation of application Ser. No. 08/469,704 filed Jun. 6, 1995, now abandoned which is a continuation of application Ser. No. 08/097,506, filed on Jul. 27, 1993, now abandoned.

BACKGROUND OF THE INVENTION

The present invention relates in general to systems and methods for monitoring the activities of computers. More particularly, the invention is directed to systems and methods for selectively and contemporaneously monitoring the states of client application type processes executing in a multiprocess server of a client-server network.

The client-server processing model has been widely adopted in the definition of distributed computing type networks. In the context of such networks, better performance with higher degrees of service concurrence have been exhibited by server operating systems which execute multiple client application programs through multiple processes. Examples are the OS/2® and AIX® operating system programs commercially available from IBM Corporation. In contrast, single process operating systems require the server to await the completion of a current client's application program before commencing any aspect of a new client's application program.

The present concept of multiprocessing from the software perspective should not be confused with classical multiprocessing from the hardware perspective. From the hardware perspective, microprocessors such as the Intel Corp. models 80386 and 80486 incorporate time sharing features which accomplish multiprocessing through a time allocation for the different instructions being processed. In contrast, microprocessors such as the Intel Corp. model 80286 do not provide such a hardware capability, requiring that software manage any concurrent execution of multiple application programs. Operating system software which accomplishes this task for a 80286 type processor, and equally for the 80386 and 80486 microprocessors, is the aforementioned OS/2 operating system program. The present invention is directed to process management in the context of such an operating system, and not in the context of management by the microprocessor hardware.

The client-server network architecture is generally well known. With the advent of multiprocessing operating system capabilities in the servers, associating the activities occurring in the server to specific client application program processes has proven to be a significant challenge not only for the user clients but even for network administrators. Though operating systems, such as the aforementioned AIX program, provide resources for monitoring the state of a composite operating system on a server workstation, no contemporaneous information is provided about the states of the individual client application processes executing on the server. This level of information is particularly important to developers of client-server application programs. For example, presently available operating system monitors do not provide users with information regarding the server's work on a specific application program, or why a specific application program is hung up, or the identity of a semaphore delaying an application process. This deficiency is attributable to the fact that present operating system monitors do not link to the individual application processes, but rather, reflect the state of the composite of all server processes, viewed from the level of the operating system. Though trace log data could be generated in sufficient detail, the volume of the data requires storage to disk and time consuming analysis.

Therefore, a need exists for a monitoring system which provides contemporaneous information about the status of individual client application processes undergoing execution on a multiprocessing server in a client-server network.

SUMMARY OF THE INVENTION

The present invention provides systems and methods for monitoring individual server processes at the granularity of the client's application program. Information regarding the status of each client application program as reflected by a server process is acquired and made available to the network administrator or client. In one form, the invention is directed to a monitoring system of a multiprocess server in a client-server network and comprises, a means for creating multiple control blocks of a server process monitor on a server processor, means for relating server application processes to control blocks in a server processor, means for storing the control blocks in memory shared by the different server application processes, and means for indicating the status of a server application process responsive to a server process monitor access of a control block. In other forms, the invention relates to program products executable on server processor workstations and methods for accomplishing such application process selective monitoring.

In a preferred form, the invention involves a server process monitor program for creating control blocks and descriptors in a shared range of a server workstation memory. The control blocks are linked to and accessed by every server process executing a client application. In addition, every process running on the server has associated therewith synchronization object descriptors, defining semaphore or message queue states, which are similarly stored in shared memory. The control blocks and descriptors are registered with the server process monitor program upon creation and are accessed by the server process monitor program to derive, and subsequently indicate on a video display or the like, the status of one or more of the server processes which are executing client applications.

The server process monitor function can also be performed by an operating system deamon process, which deamon process periodically reads the server process status information from the control blocks or descriptors in shared memory and displays the status on a dedicated window of a video display.

Irrespective of the particular form chosen, the information provides network administrators, software developers or field engineers with management, performance and diagnostic information at the granularity of each client process within a complex client server network.

These and other features of the invention will be more clearly understood and appreciated upon considering the particulars of the detailed embodiment described hereinafter.

DESCRIPTION OF THE PREFERRED EMBODIMENT

Figure 1:
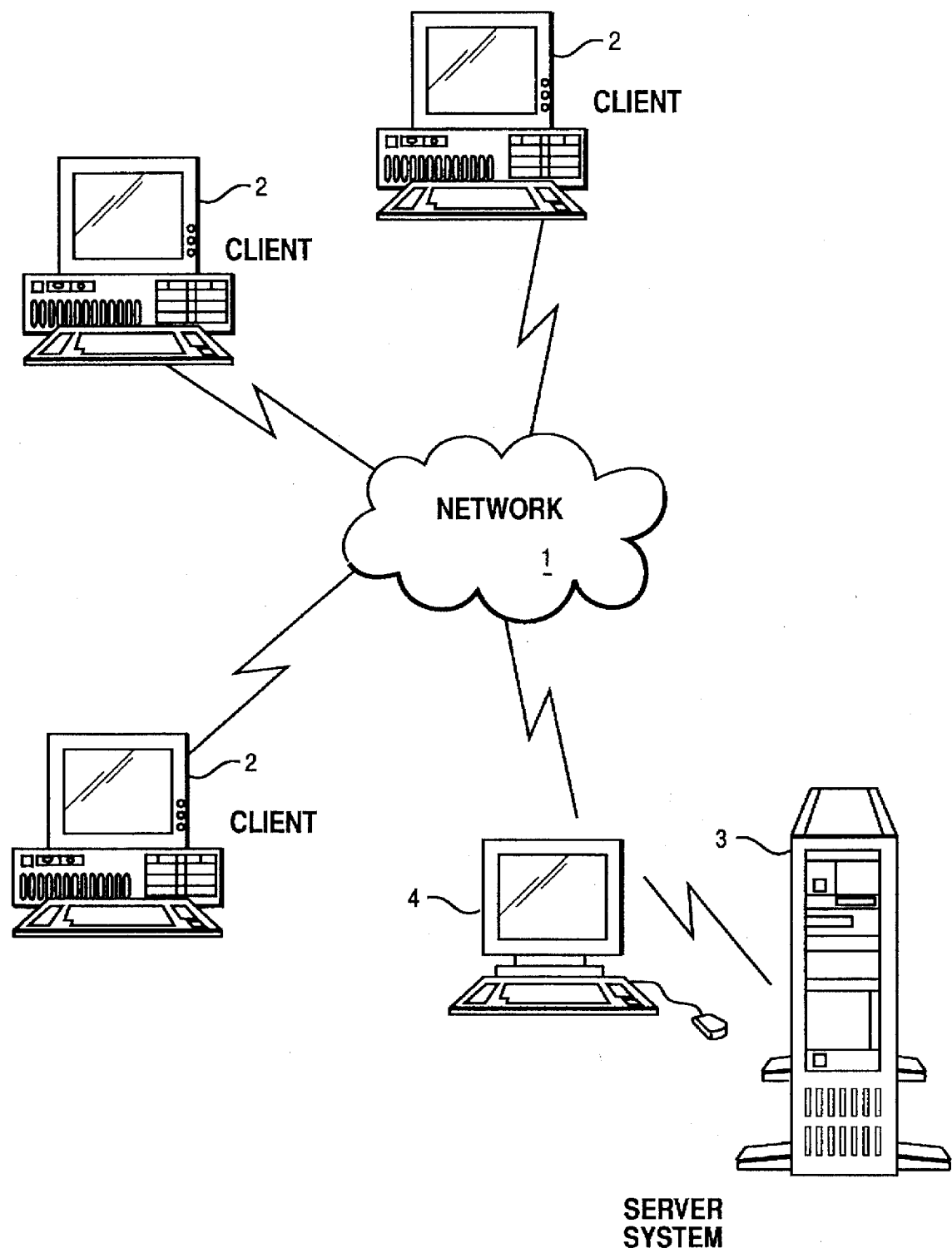
FIG. 1 is a schematic diagram depicting a client server network.

The present invention is particularly useful in the context of a client-server network of the form depicted in FIG. 1. FIG. 1 shows a network 1 with a number of clients 2 and a server 3. Representative examples of the clients 1 and servers 3 would be PS/2 or RISC System/6000 workstations as are commercially available from IBM Corporation. A representative choice for network 1 in the context of PS/2 workstations would be Netbios and in such context include OS/2 Lan Server client code on respective workstations 2 and OS/2 Lan Server server code executing on server workstation 3. These operating systems are also commercially available from IBM Corporation. In the context of the RISC System/6000 workstation implementation, a preferred choice for the network would be TCP/IP and accordingly include in client 2 and server 3 workstations AIX type TCP/IP Server code, also commercially available from IBM Corporation.

Client workstations 2 transmit over network 1 requests that server 3 execute certain application program code responsive to commands issued by the client. In particular, the invention is directed to the server 3 executing in the multiprocessing mode of the aforementioned OS/2 or AIX operating systems, so that the various requests from the multiple clients timeshare the resources of server 3. The purpose of the server monitor is to determine and display, such as by way of video display 4, the status of each process associated with each individual application program invoked by a respective client. This is in contrast to presently available operating system monitors which merely describe the overall state of the server and not the states of the individual processes. Those differences become crucial when a client, network administrator, software developer or field engineer needs to know the specific state of a client's process, not only in ascertaining its momentary status, but also in identifying, when, where and in what code and under what conditions process execution is temporarily or permanently interrupted.

Figure 2:
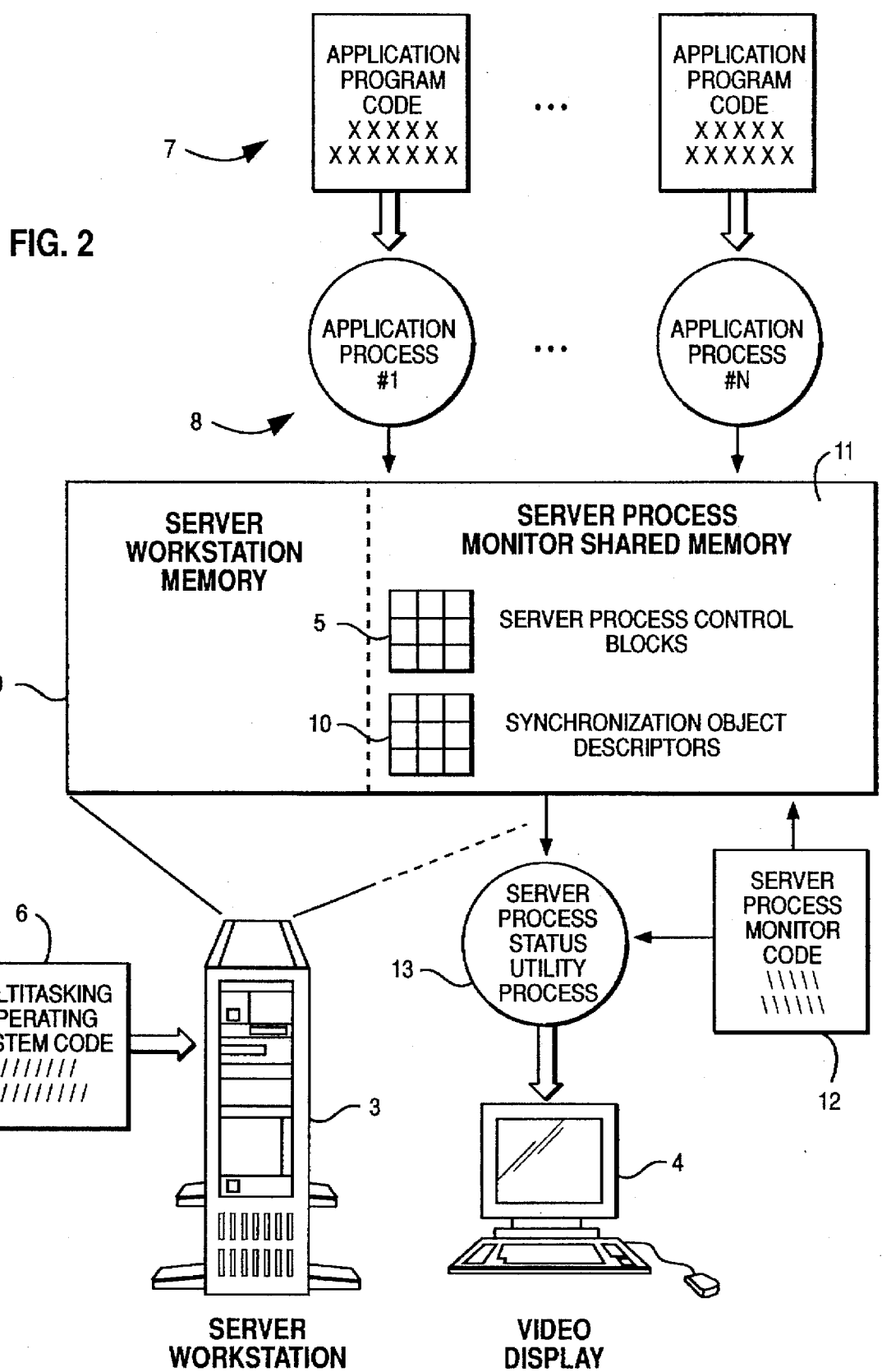
FIG. 2 is a schematic diagram depicting server processes and the server operating environment.

FIG. 2 schematically depicts the functional relationships between the processes and system elements needed to implement the present invention. Server workstation 3 executes multitasking operating system code 6, a code suitable to manage by software processes the relatively concurrent execution of application program code 7 and related application processes 8 of the multiple clients 2 (FIG. 1) served by workstation 3. The present invention provides systems and methods for monitoring individual server processes at the granularity of the application program in contrast to the network or server operating system. Information regarding the status of individual server processes is acquired and made available for system administrator or user consideration.

An example of a multiprocessing server application program for which the present server process monitor has particular relevance is the IBM Parallel Database Manager Server program, commercially available from IBM Corporation. The Parallel Database Manager Server program is composed of multiple server processes, which include a pool of database manager agent processes, a deadlock detector process, a parallel database communication process, client communication processes, host gateway communication processes, and high availability processes. These server processes cooperate to provide the database manager service to the individual applications invoked by the clients. The process synchronization among the server processes is implemented through the process concurrence services of the base operating system, in this case the earlier noted OS/2 or AIX operating system. Semaphores, signals, and locks are examples of process concurrence services. The server processes also communicate among each other by sending information through shared memory or message queues.

These server processes can be forced into a wait states, which states can be induced by a number of different reasons. For example, an agent process might wait for a reply message from a parallel database communication process, or for a new application request. Similarly, two agent processes might attempt to access the same database record at the same time, or a group of processes might be trapped into a deadlock situation. With so many server processes working concurrently in the system, a system level, but process specific, tool to monitor the server processes is needed by software developers, network administrators or service engineers when diagnosing malfunctions in a multiprocessing server.

The present server process monitor differs from the operating system process monitor. The process monitor of the base operating system describes the states of each process in terms of operating system parameters. For instance, the "PS" command in the AIX operating system causes the display of the user id, the process id, the parent process id, the start time, and the execution command of each AIX process. In contrast, the present server process monitor describes the server processes in terms of the state of each client's application process. Examples of valuable state information about the progress of an "agent" type process for the Parallel Database Manager Server are as follows:

in free agent queue waiting on the database manager queue waiting on the parallel database queue processing database manager requests processing parallel database requests waiting on buffer queue services connection: token=xxxx, sid=x, waiting on closing buffer queue services connection: token=xxxx waiting on buffer distribution services message: token=xxxx, sid=x, rid=x waiting on buffer queue services data: token=xxxx, sid=x, rid=x waiting on fast communication manager memory request waiting on parallel database agent shared information waiting on table access: table token=xxxx waiting on access to data management services database control block waiting on access to data protection services database control block waiting to access to data protection services read buffer waiting to write a log deadlock detector waiting for time out waiting for log I/O done From the examples of the states identified above it becomes apparent that the server process monitor provides state particulars about each individual server application process in contrast to merely identifying the presence of an application process.

Multiprocessing server 3 depicted in FIG. 2 includes within its memory 9 a shared memory region 11. Server process control blocks 5 and synchronization object descriptors/blocks 10 are defined within shared memory 11. The placement of the control blocks and descriptors within the shared range of the memory addresses ensures that all the processes are accessible to all of the control blocks of the process monitor. The common access also applies to server process monitor code 12, which defines a distinct server process status utility process 13. Control block and descriptor information is extracted and visually depicted on video display 4 by the utility process.

A server process is described in shared memory 11 by a server process control block. Such a block is created when a server process is generated and registered with the server process monitor. The server process control block preferably contains four fields:

proc_id: the process id of the server process.

proc-type: by the nature of the server process, the server processes can be grouped into different process types. A server process can be a database agent process, communication process, a deadlock detector, et cetera. New process types can be created by the applications.

proc_state: a process is either in "runnable" or "waiting" state.

syn_obj_handle: the handle of the synchronization object which associates with the server process. The handle of the synchronization object is the address of the synchronization object descriptor.

When a new server process type is created, a server process type record is also created. Each server process type record contains the following fields:

proc_type: the server process type identification.

proc_desc: a text string that describes the function of the server process.

Synchronization objects such as latches, semaphores, wait post areas, or message queues are described by synchronization object descriptors in the server process monitor. Each synchronization object descriptor preferably contains the following data fields:

syn_obj_type: the types of the synchronization objects, including latch, wait post area, or message queue.

syn_obj_id: each synchronization object type has its own unique identifier. Latches are identified by latch handles, wait post areas are identified by wait post area handles, and message queues are referenced to message queue descriptors.

syn_obj_desc: a text string that describes the purpose of the synchronization object.

A set of application program interfaces suitable to use the data structures and described above is defined through a combination of a description, pseudocode, and correspondence to a flow diagram of those depicted in the drawings.

The first application program interface (API) is to create a new server process type.

The input is:

proc_desc: a text string that describes the function of the server process.

The output is:

proc_type: the server process type identification.

Pseudocode defining the creation of a new server process type is as follows:

create a new server process type.

allocate a new server process type record.

define the server process type identification.

initialize the server process type record with the server process type identification and the server process description.

return the server process type identification to the application program caller.

Figure 3:
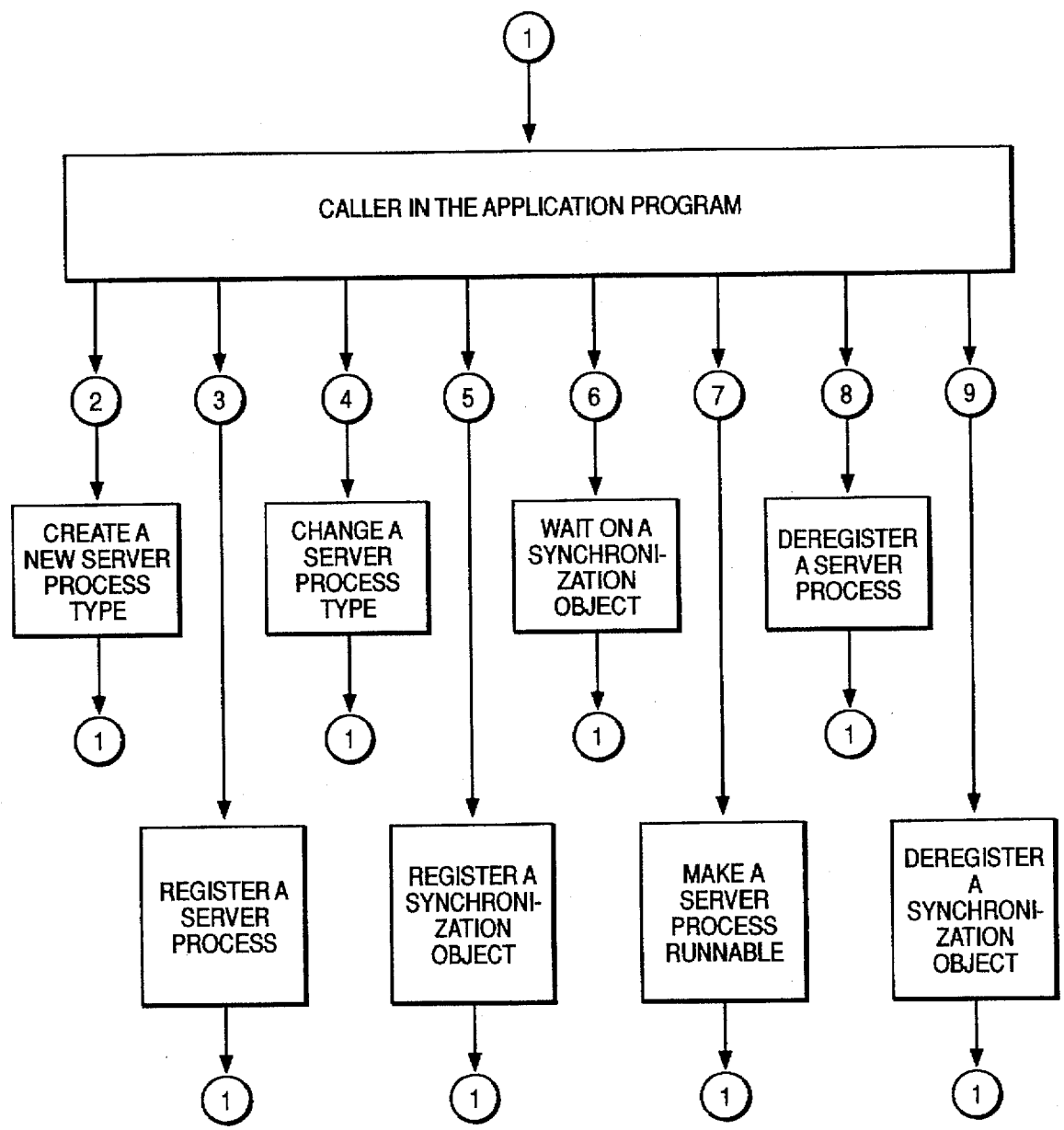
FIG. 3 is a schematic diagram depicting a composite flow diagram for the processes of the system.
Figure 4:
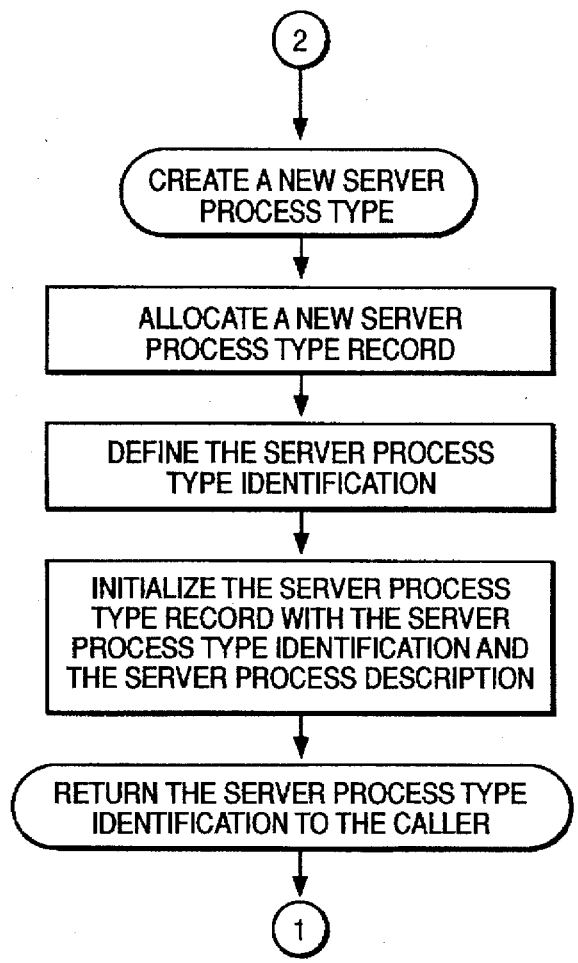
FIGS. 4–11 are schematics with the individual flow diagrams of those depicted in FIG. 3.

The flow diagram corresponding to the steps necessary to create a new server process type appears in FIG. 4, which figure relates to the process composite in FIG. 3.

After a new server process is created, it must register with the server process monitor. In that situation the input is:

proc_id: the process id of the server process.

proc_type: the server process type identification.

The registration process identified as reg_svr_proc has its output:

ret_sta: return status.

Pseudocode corresponding to the registration of a server process is as follows:

create a server process control block for the server process.

initialize the server process control block with the process id and the server process type.

return control to the caller of the application program.

Figure 5:
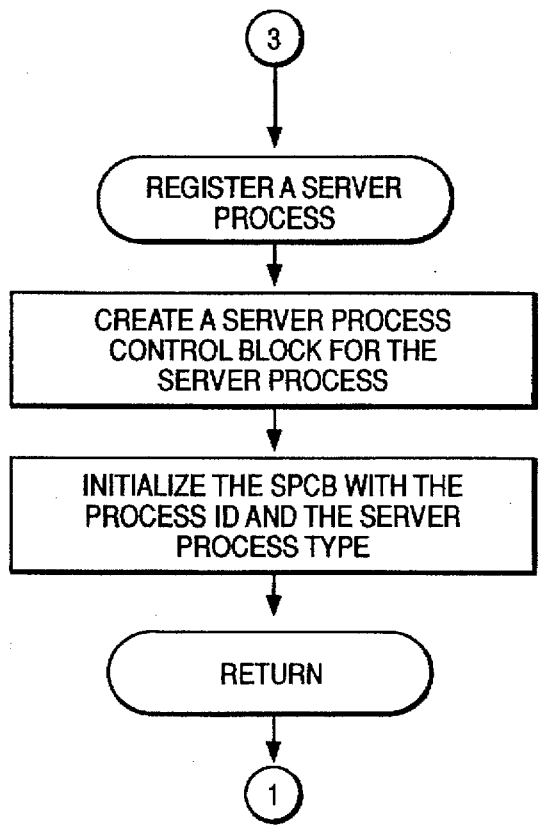
Figure 6:
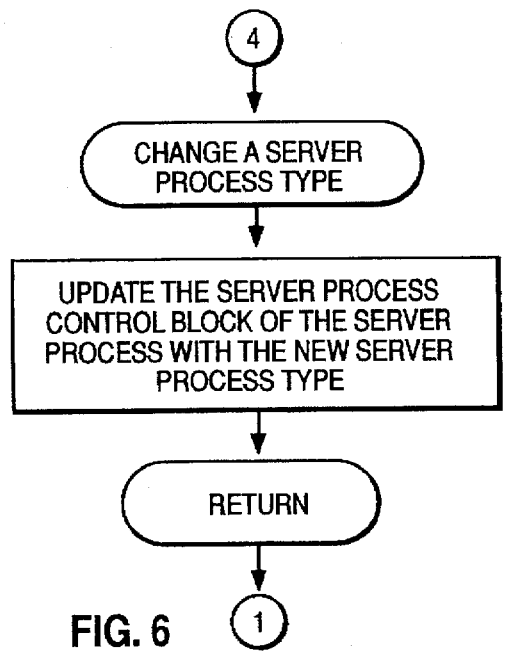

The flow diagram corresponding to the registration of a server process appears in FIG. 5, which is likewise a part of the composite depicted in FIG. 3.

The next application program interface (API) involves a change of the process type: chg_svr_proc. The change of the server process type from one to another involves an input of:

proc_id: the process id of the server process proc_type: the new server process type identification.

The output of the application program interface is:

ret_sta: return status

Pseudocode for changing a server process is as follows:

update the server process control block of the server process with the new server process type.

return control to the caller in the application program.

The corresponding flow diagram is depicted in FIG. of the drawings.

The application programming interface (API) reg_syn_obj registers a synchronization object such as a latch, semaphore, or message queue. The registration must be accomplished before it is referenced by a server process. The registration involves an input of:

syn_obj_type: the types of synchronization objects can be latches, wait post areas, or message queues. The synchronization object type identifications are defined by the server process monitor.

syn_obj_id: each synchronization object type has its unique identifier. The synchronization object identifiers are defined by the base operating system when they are created.

syn_obj_desc: a text string to describe the function of the synchronization object.

As an output the API provides:

syn_obj_handle: the address of the synchronization object descriptor.

Figure 7:
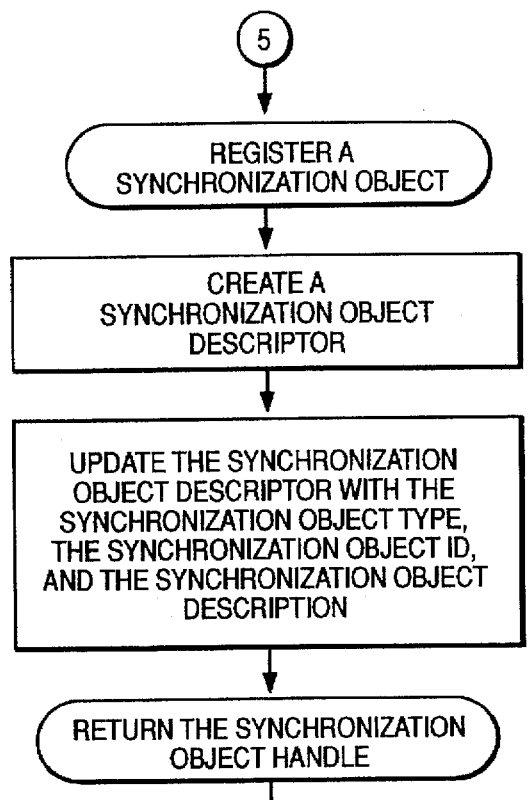

Pseudocode for implementing the API is set forth below in correspondence to FIG. 7 of the drawings.

Create a synchronization object descriptor.

Update the synchronization object descriptor with a synchronization object type, synchronization object id, and the synchronization object description.

Return the synchronization object handle to the caller in the application program.

Before the server process calls the base operating system services to operate the synchronization object, the server process must call the wait_syn_obj to associate itself with the synchronization object. The API involves an input of:

proc_id: the process id of the server process syn_obj_handle: the address of the synchronization object descriptor.

As an output of the API there is provided:

ret_sta: return status

Figure 8:
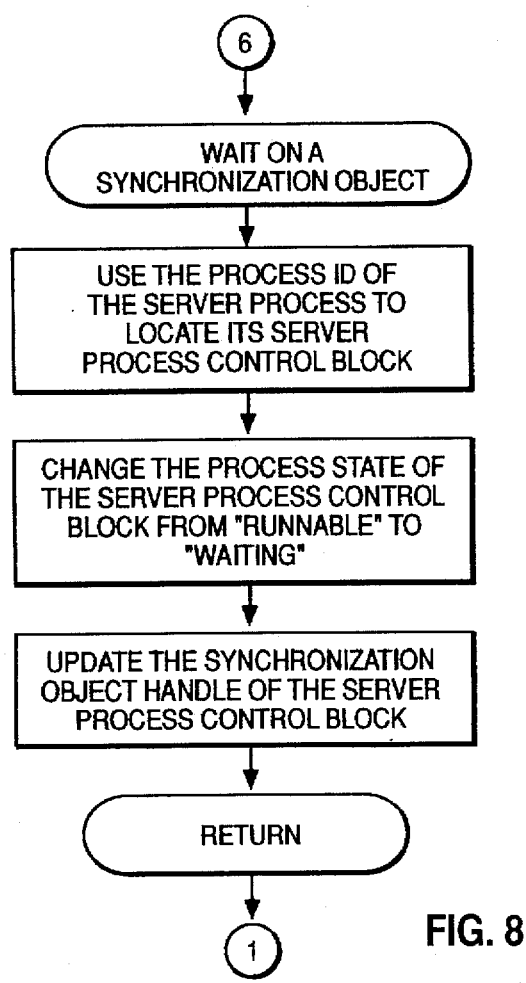

Pseudocode corresponding to the flow diagram in FIG. 8 of the drawings is set forth below:

use the process id of the server process to locate the server process control block.

change the process state of the server process control block from the: "runnable" to the "waiting" state.

update the synchronization object handle of the server process control block.

return control to the caller in the application program.

When the server process returns from the executing operations on the synchronization object, the server process calls run_svr_proc to change the server process state from "waiting" to "runnable".

The input is:

proc_id: the process id of the server process.

The output is:

ret_sta: return status.

Figure 9:
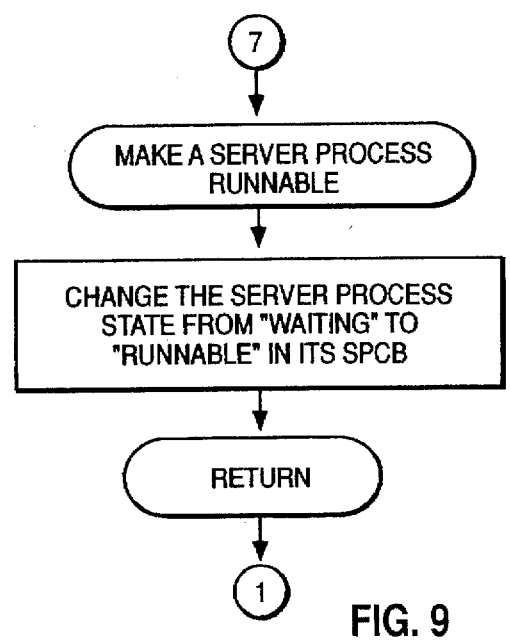

The corresponding pseudocode, is depicted by flow diagram in FIG. 9, involves the follows:

Change the server process from "waiting" to "runnable" in its server process control block.

Return control to the caller in the application program.

A server process can be deregistered with the server process monitor by calling the dereg_svr_proc API. The server process control block of the server process will thereupon be freed. When a server process is terminated, by convention or otherwise, the server process exit routine calls dereg_svr_proc to deregister it from the server process monitor. The input to the API is:

proc_id: the process id of the server process. The output is:

ret_sta: return status.

Figure 10:
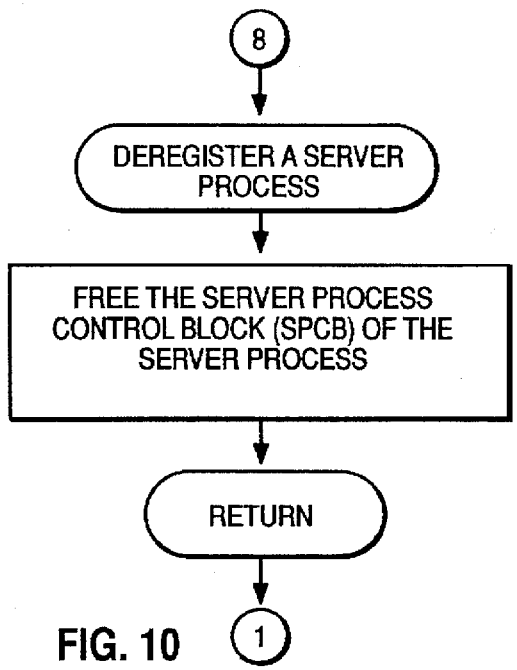

Pseudocode corresponding to the flow diagram in FIG. 10 is as follows:

free the server process control block of the server process.

return control to the caller in the application program.

A synchronization object is deregistered from the server process monitor by calling an API identified as dereg_syn_obj. The syn_obj_type in the synchronization object in descriptor is changed to invalid_obj. The corresponding syn_obj_id in the synchronization object descriptor is changed to zero. The syn_obj_desc in the corresponding synchronization object descriptor is changed to a null string pointer.

The input to the API is:

syn_obj_handle: the address of the synchronization object descriptor.

The output the of the API is:

ret_sta: return status.

Figure 11:
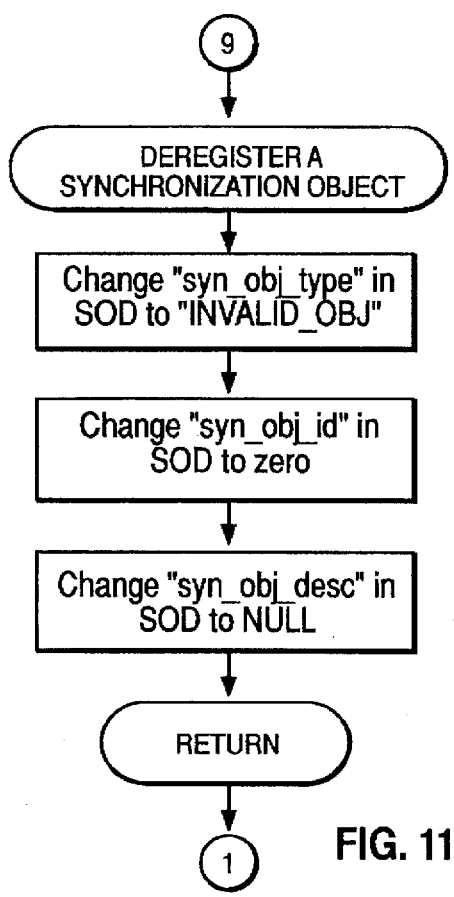

The flow diagram for this API appears in FIG. 11 and corresponds to the following pseudocode:

change syn_obj_type in the synchronization object descriptor to invalid_obj.

change syn_obj_id in the synchronization object descriptor to zero.

change syn_obj_desc in the synchronization object descriptor to null.

return control to the caller in the application program.

Figure 12:
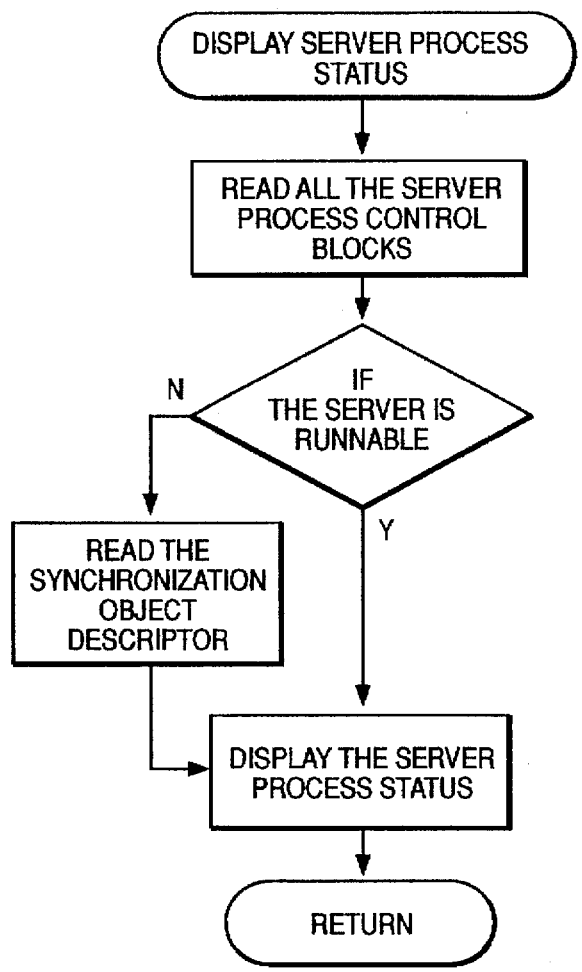
FIG. 12 is a schematic depicting the video operation display flow diagram.

An API utility suitable to convey server process status information to the video display, such as video display 4 in FIG. 2, is presented by flow diagram in FIG. 12. The server process status utility can be issued from any window of the base operating system. The utility spawns a process, process 13 in FIG. 2, which has read access to the server process monitor residing in shared memory 11 of server workstation 3, as depicted in FIG. 2. The utility reads the server process control block and synchronization object descriptor information and provides that information to video display terminal 4 in the format selected by the user. In a preferred form, the utility provides the user with options for selecting the server process status by process type, process state or the process id.

The utility includes resources for interpreting the synchronization object descriptor on which a process is waiting in those situations where the server process is in a waiting state.

Pseudocode to display the server process status, corresponding to the flow diagram in FIG. 12, is set forth as follows:

read all the server process control blocks.

if the server is runable.

display the server process status.

else.

read the synchronization object descriptor.

endif.

return control to the caller in the server process status program.

Though the invention has been described and illustrated by way of a specific enbodiment, the methods, systems and programs encompassed by the invention should be interpreted consistent with the breadth of the claims set forth hereinafter.

I claim:

1. In a multiprocess server having a memory, a monitor comprising:

a server process, executing on the multiprocess server, which selectively creates a new server process, registers a new server process, changes a server process type, registers a synchronization object, waits on a synchronization object, runs following a wait on a synchronization object, deregisters a serve process, and deregisters a synchronization object, responsive to calls from client application program processes;

means for executing multiple client application program processes which selectively issue calls to the server process to create a new server process, register a new server process, change a server process type, register a synchronization object, wait on a synchronization object, run following a wait on a synchronization object, deregister a server process, and deregister a synchronization object on the multiprocess server operating in a client-server network;

a daemon process which periodically reads client process information from control blocks;

means for creating multiple control blocks with control fields providing client application program process type information for the daemon process in a part of the memory of the multiprocess server, which part of the memory is accessible to the different client application program processes;

means for client application program processes to register with the daemon process and have select control blocks related thereto;

means for client application program processes to pass state information to select control blocks, the state information relating to calls for the server process to create a new server process, register a new server process, change a server process type, register a synchronization object, wait on a synchronization object, run following a wait on a synchronization object, deregister a server process, and deregister a synchronization object; and means for visually depicting the status of a client application program process using the state information accessed from control blocks by the daemon process.

2. The apparatus recited in claim 1, wherein the means for client application program processes to register with the daemon process performs the registration upon the creation of a client application program process in the a multiprocess server.

3. The apparatus recited in claim 2, further comprising:

means for registering a synchronization object with the daemon process upon creation of the synchronization object in the multiprocess server.

4. A method of operating a server process monitor of a multiprocess server having a memory and operating in a client-server network, comprising the steps of:

executing a server process on the multiprocess server which selectively creates a new server process, registers a new server process, changes a server process type, registers a synchronization object, waits on a synchronization object, runs following a wait on a synchronization object, deregisters a serve process, and deregisters a synchronization object, responsive to calls from client application program processes;

executing multiple client application program processes which selectively issue calls to the server process to create a new server process, register a new server process, change a server process type, register a synchronization object, wait on a synchronization object, run following a wait on a synchronization object, deregister a server process, and deregister a synchronization object on the multiprocess server operating in a client-server network;

creating a daemon process which periodically reads client process information from control block;

creating multiple control blocks with control fields providing client application program process type information for the daemon process in a part of the memory of the multiprocess server, which part of the memory is accessible to the different client application program processes;

registering client application program processes with the daemon process and having select control blocks related thereto;

passing client application program process state information to select control blocks, the state information relating to calls for the server process to create a new server process, register a new server process, change a server process type, register a synchronization object, wait on a synchronization object, run following a wait on a synchronization object, deregister a server process, and deregister a synchronization object; and visually depicting the status of a client application program process using the state information accessed from control blocks by the daemon process.

5. The method recited in claim 4, wherein the registering of the client application program processes with the daemon process occurs upon the creation of a client application program process in the multiprocess server.

6. The method recited in claim 5, further comprising the step of:

registering a synchronization object with the daemon process upon creation of the synchronization object in the multiprocess server.

\* \* \* \* \*